June 14, 1960 R. H. PINTELL 2,941,158

STABILIZED OSCILLATOR

Filed Aug. 9, 1956

ROBERT H. PINTELL
INVENTOR

BY Karl F. Ross
AGENT 2,941,158

STABILIZED OSCILLATOR

Robert H. Pintell, New York, N.Y., assignor, by mesne assignments, to Intron International, Inc., Bronx, N.Y.

Filed Aug. 9, 1956, Ser. No. 603,060

21 Claims. (Cl. 331—109)

My present invention relates to a circuit arrangement for generating oscillations of accurately controlled amplitude adapted to serve either as a carrier for a direct-current or low-frequency signal or as a stabilized source of high-frequency energy.

An object of my invention is to provide a circuit arrangement of this character which is very sensitive to variations in a control potential.

A more specifice object of this invention, allied with the preceding one, is to provide a circuit arrangement as set forth above whose high sensitivity is utilized to bring about amplitude stabilization through feedback control.

Another object of the instant invention is to provide an oscillator of the type referred to which is self-starting and delivers a useful power output immediately upon being placed in operation.

A further, more particular object of the invention is to provide a circuit arrangement as defined above which utilizes the oscillatory properties of a regeneratively coupled solid-state amplifier or transducer, such as a transistor, a double-base diode or a magneto-resistive element, as a source of output power.

Still further objects of my invention are to provide an oscillatory circuit arrangement adapted to produce a substantially constant output in the face of wide variations in its load impedance, in ambient temperature and/or in the output voltage of its direct-current supply.

A feature of my instant invention resides in the provision of an amplifier with a regenerative feedback path including, as part of said path, an electrically controlled resistance element responsive to input signals of a frequency considerably lower than the operating frequency of the oscillatory amplifier. The input signals may be derived from an extraneous source or, through a suitable rectification and integration network, from the oscillatory output of the amplifier itself; in the latter case the rectified control signal is fed back degeneratively to the signal-responsive resistance element in order to stabilize the output amplitude of the system. If the amplifier circuit includes impedance elements whose resistance is subject to variations with ambient temperature, the signal-responsive resistance element in the feedback circuit may be associated with an element having a compensatory thermal coefficient of resistance so as at least partially to balance the changes in conductivity.

According to a more specific feature of this invention, the signal-responsive resistance element in the feedback connection of the oscillatory circuit may be an ancillary amplifier, preferably similar in character to the main amplifier, having its forward amplification path (mu-circuit) serially included in the feedback connection. Thus, both amplifiers may comprise transistors or other types of solid-state amplifiers, e.g. magnetoresistive devices.

With such an arrangement, using conventional junction-type transistors, I have been able to limit voltage regulation to not more than 0.1% in the presence of supply voltage variations of ±20%, temperatures ranging between ±75° C. and load current variations of ±100%.

This precise and virtually instantaneous stabilization of the output energy prevents transistor burnout even if the load should be suddenly short-circuited or open-circuited, thereby greatly increasing the life span of my improved system over known circuit arrangements of the same general character.

The above and other objects, features and advantages of my invention will become more fully apparent from the following detailed description of certain specific embodiments, reference being had to the accompanying drawing in which.

Figures 1, 2, 3, 4, 5, 6, 7, 8:
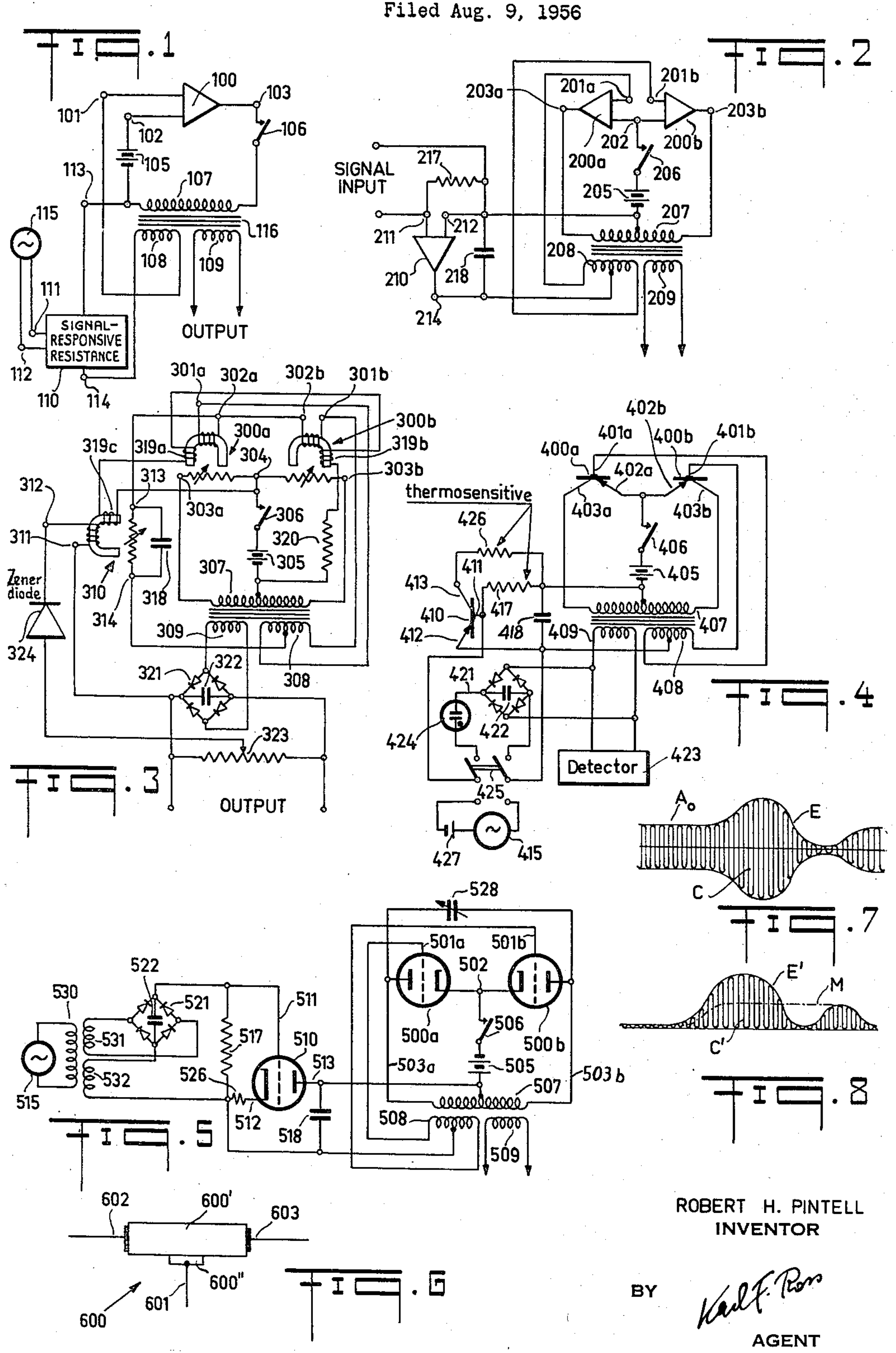
Fig. 1 is a circuit diagram of an oscillatory system serving to illustrate the broad concept of my invention.
Fig. 2 is a circuit diagram similar to Fig. 1 but showing my invention embodied in a system of the push-pull type.
Fig. 3 is a circuit diagram similar to Fig. 2 but showing, more specifically, magnetoresistive amplifying devices in lieu of the generalized amplifiers shown in the preceding figures.
Fig. 4 is a circuit diagram similar to Fig. 3 but illustrating the use of transistors instead of the magnetoresistive amplifiers of Fig. 3.
Fig. 5 is a circuit diagram of a further embodiment of my invention, utilizing vacuum-tube amplifiers in place of the solid-state amplifiers referred to above.
Fig. 6 illustrates a double-base diode adapted to be used in a system according to the invention.
Figs. 7 and 8 are graphs illustrating the wave shape of the output of a system according to Fig. 4 and Fig. 5, respectively.

The oscillatory system of Fig. 1 comprises an amplifier 100, which may consist of one or more stages, having input terminals 101, 102 and an output terminal 103. The amplifier output, taken between terminal 103 and either input terminal 101, 102, is controlled by the sign and the magnitude of a voltage impressed across these input terminals as is well understood. The output circuit shown in Fig. 1 includes a source of direct current 105, shown schematically as a battery, in series with an on-off switch 106 and the primary winding 107 of a transformer whose two secondary windings have been designated 108 and 109; this circuit is connected across the terminals 102 and 103 of amplifier 100.

Regenerative feedback is provided by connecting the secondary winding 108 across input terminals 101, 102 in such sense that the driving voltage applied to the amplifier by this winding will be of a polarity tending to increase the amplifier output. The feedback path also includes, in series with winding 108, an electronically controlled resistance element 110, shown here diagrammatically as a four-terminal network with input terminals 111, 112 and output terminals 113, 114. A signal source 115 is shown connected across the input terminals 111, 112 of resistance element 110; output terminal 113 thereof is connected to amplifier terminal 102 and to the left-hand extremity of transformer primary 107, its other output terminal 114 being connected to an extremity of transformer secondary 108. Transformer secondary 109 represents an output winding and works into a suitable load (not shown).

In operation, closure of switch 106 causes amplifier 100 to break into oscillations whose frequency is determined by the reactances present in the feedback loop as is well known per se; these reactances include the mutual inductance between transformer windings 107, 108 which, if the transformer has a ferrous core as indicated schematically at 116, is a variable quantity following the slope of the hysteresis loop of the core material. The circuit constants are so selected that the oscillatory frequency of the system lies above the highest operating frequency of signal source 115. Under these circumstances the amplitude of the oscillations is determined at every instant by the amount of resistance provided by network 110 between its terminals 113, 114 in response to a particular input voltage present at its terminals 111, 112.

Elements corresponding to those shown in Fig. 1 have been designated in subsequent figures by similar reference numerals but with the "1" of the hundreds digit replaced by the number of the respective figure. Thus, I have shown in Fig. 2 a system generally similar to Fig. 1 but with the single amplifier 100 replaced by a pair of push-pull-connected amplifiers 200*a*, 200*b*. A common input terminal 202 of these amplifiers is connected through switch 206 and battery 205 to the midpoint of transformer primary 207 whose extremities are connected to the respective amplifier output terminals 203*a*, 203*b*. It will be understood that this particular mode of connection of amplifiers 200*a*, 200*b* is representative of several possible arrangements for mirror-symmetrically connecting these two amplifiers across a common output circuit. The remaining input terminals 201*a*, 201*b* of the two amplifiers are connected to respective extremities of feedback winding 208 whose midpoint is connected to an output terminal 214 of the signal-responsive resistance element; this element is here shown as amplifier 210, which may also comprise one or more stages, and its second output terminal is here replaced by one of its input terminals 211, 212 as described above in connection with three-terminal device 100. Thus, the feedback path is completed by a connection from input terminal 212 to the center tap of winding 207 and to one of the poles (here arbitrarily taken as the negative pole) of battery 205.

A high resistance 217 is bridged across input terminals 211, 212 of amplifier 210 whose output terminals 212, 214 are at the same time bridged by a condenser 218. Input signals are impressed upon terminals 211 and 212 from a source not shown in Fig. 2. The output of the system is derived from the other transformer secondary winding 209. Resistor 217 forms part of a network for so biasing the ancillary amplifier 210 that its internal resistance will have a predetermined finite value in the no-signal condition; condenser 218 serves to bias the input terminals 201*a*, 201*b* of push-pull amplifier 200*a*, 200*b* to alternate cutoff. The operation of the arrangement of Fig. 2 is otherwise similar to that of the system of Fig. 1, except that output current from battery 205 flows alternately through amplifiers 200*a* and 200*b* at successive half-cycles of the operating frequency.

In Fig. 3 I have shown the amplifiers of the circuit of Fig. 2 as represented by magnetoresistive devices 300*a*, 300*b* and 310. Each of these devices comprises a resistive element immersed in the field of an associated electromagnet whose coil is traversed by a control current in response to an input signal; as the field strength varies, the resistance of the resistive element also changes so that an output current traversing this element is modulated in conformity with the fluctuations of the input signal. Known materials exhibiting magnetoresistive properties include bismuth, indium antimonide and indium arsenide.

The magnetoresistive amplifiers 300*a* and 300*b*, being four-terminal devices, have a common output terminal 304, connected via switch 306 and battery 305 to the midpoint of transformer primary 307, in addition to their output terminals 303*a*, 303*b* connected to opposite ends of this primary by analogy with Fig. 2. Their input terminals 301*a*, 301*b* are connected across feedback winding 308; their remaining input terminals 302*a*, 302*b*, tied together to constitute in effect a single terminal, are connected to output terminal 313 of ancillary amplifier 310 at the upper end of its magnetoresistive element. The lower end of this element, constituting the second output terminal 314 of the ancillary amplifier, is returned to the midpoint of feedback winding 308. A biasing condenser 318 is bridged across said element between terminals 313 and 314.

Special biasing windings 319*a*, 319*b*, 319*c* are provided on the electromagnets of amplifiers 300*a*, 300*b*, 310 in order to make them preferentially responsive to input currents of a particular polarity. These biasing windings are connected in series with each other and with a resistor 320 across the combination of battery 305 and switch 306. The connection between feedback winding 308 and the input windings of these amplifiers is such that the feedback current reinforces the flux due to either biasing winding whenever the primary current passing through the associated magnetoresistive element increases, thereby further lowering the resistance of this element and augmenting the primary current.

In the embodiment shown in Fig. 3, the control signal applied to the input terminal 311, 312 of the ancillary amplifier 310 is derived directly from the load winding 309 whose output is rectified by a full-wave bridge circuit 321 and smoothed by a condenser 322 connected across the output diagonal of the bridge. A load, not shown, and a potentiometer 323 are also connected across this diagonal. The input circuit of amplifier 310 includes a portion of potentiometer 323 between its sliding tap and its left-hand terminal. The arrangement is such that any increase in potentiometer voltage weakens the field of amplifier 310 and increases the resistance between its output terminals 313 and 314, thereby lowering the amplitude of the generated oscillations and reducing the output voltage of bridge circuit 321. Since compensation necessarily is less than complete, large changes in the output voltage of the effective potentiometer portion, as brought about by a displacement of its slider, will result in oscillations of different amplitudes.

In accordance with a particular feature of this invention, I include in the degenerative feedback path from bridge 321 a non-linear impedance element whose resistance varies sharply and inversely with voltage over a predetermined range so as to give a nearly vertical current-versus-voltage characteristic. One element of this description is a Zener-type solid-state diode, indicated schematically at 324, operated in its reverse or high-resistance direction. As is known, there exists a breakdown voltage above which current in the reverse direction rises rapidly with but small increments in voltage. Thus, with the system properly biased, small fluctuations in output voltage across bridge 321 will result in large compensatory variations of the magnetic field of amplifier 310 tending to restore the original equilibrium. An output wave of highly constant yet adjustable amplitude will thus be available across the output diagonal of bridge 321.

The amplifiers of Fig. 4 are shown as transistors 400*a*, 400*b* and 410. Input terminals 401*a* and 401*b*, connected across feedback winding 408, are base connections; input terminals 402*a* and 402*b*, connected together and through switch 406 and battery 405 to the midpoint of primary 407, are emitter connections; and output terminals 403*a*, 403*b*, connected across the ends of primary 407, are collector connections. Transistor 410 similarly has a base connection 411, connected to the left-hand armature of a double-pole, double-throw switch 425 and representing one of the input terminals of the ancillary amplifier; an emitter connection 412, serving as both an input and an output terminal and connected to the midpoint of winding 408 as well as to the right-hand armature of switch 425; and a collector connection 413, constituting the other output terminal and connected to the center tap of transformer primary 407 by way of a resistor 426 whose value is small compared to that of resistor 417 inserted between the same center tap and base 411. A condenser 418 is connected between the same center tap and emitter 412. being thus bridged across the output terminals of transistor 410 in series with the small resistance 426.

Associated with switch 425 are two alternative input circuits for ancillary amplifier 410. One input circuit, connected in the lower position of switch 425, includes a signal source 415 in series with a small biasing battery 427. The other output circuit, rendered effective in the upper switch position, is a degenerative feedback path which is similar to the one described in connection with Fig. 3 and includes a rectifier bridge 421 with condenser 422, connected across load winding 409, as well as a nonlinear impedance device 424 in series with the ouput diagonal of the bridge. Device 424 is here shown as a gas-filled diode, such as a neon glow tube, which also has a nearly vertical current/voltage characteristic in the region beyond its breakdown point; again, the circuit constants are such that the diode operates in this particular region of its characteristic.

Owing to the provision of resistor 417, the base 411 and the collector 413 of transistor 410 are initially at the same potential so that no reverse bias is present immediately upon closure of switch 406 and the impedance of the regenerative feedback path of push-pull amplifier 400*a*, 400*b* is very low at first, thereby insuring a quick starting of the oscillatory circuit and rapid buildup of the oscillations to their stabilized or normal no-signal amplitude. As illustrated in Fig. 7, these oscillations may serve as a carrier for any type of signal of relatively low frequency from source 415, such signal acting to modulate the envelope E of carrier wave C whose normal amplitude, indicated at $A_0$, should not be less than the maximum signal amplitude of source 415. The signal is then recovered by a suitable detector circuit 423, shown connected across load winding 409, whose time constant should be large compared with the period of carrier wave C but small with respect to the period of the highest signal frequency and which, therefore, acts as an integration network.

The resistors 417 and 426, or parts thereof, may be made of appreciably thermosensitive material, as indicated, in order to compensate for changes in the conductivity of various circuit elements. Thus, an impedance element such as diode 324 or neon tube 424 may be considerably affected by changes in ambient temperature, the thermal coefficient of resistance of the former being generally positive, that of the latter negative. In accordance with this feature of my invention I provide the resistors 417 and 426 with matching positive or negative thermal coefficients of resistance whereby the output of the system will be substantially independent of temperature fluctuations.

In Fig. 5 I have shown the push-pull-connected main amplifier sections 500*a*, 500*b* and the ancillary amplifier 510 as vacuum tubes. Tubes 500*a*, 500*b* are triodes with respective grid connections 501*a*, 501*b* connected across transformer secondary 508, with a common cathode connection 502 connected via switch 506 and battery 505 to the midpoint of transformer primary 507, and with plate connections 503*a*, 503*b* connected across this primary. In contradistinction to the arrangements shown in the preceding figures, the transformer of Fig. 5 is shown as having an air core and as having its primary 507 resonated by a condenser 528 to determine the operating frequency of the oscillatory system.

Amplifier 510 is also a triode, having a cathode connection 512 tied to the midpoint of feedback winding 508, a plate connection 513 extended to the center tap of winding 507 at the positive terminal of battery 505, and a grid connection 511 returned via a grid-leak resistor 517 to the cathode; a condenser 518 is bridged between the cathode and the plate of this tube. In this embodiment I have shown the source of input signals as a generator 515 working into the primary 530 of a transformer having two secondaries 531 and 532. Winding 531 is connected across the alternating-current input diagonal of a rectifier bridge 521 whose direct-current output diagonal is bridged by a condenser 522 and is connected across resistor 517 in series with the winding 532. The effect of this arrangement is to impress upon primary winding 507 a controlled carrier, as illustrated at C′ in Fig. 8, whose no-signal amplitude is nearly zero and whose envelope E′ oscillates in the presence of signals about a median value, indicated by the dot-dash line M in Fig. 8, which is determined by the bias derived from the rectification network 521, 522. The efficiency of this "controlled carrier" system is greater than that of the simple amplitude-modulation system of Fig. 4 and substantially no current is drawn at zero signal. A resistor 526 may be inserted in the cathode lead of tube 510 to bias the system to optimum operating condition.

Although in principle the feedback in a system according to the invention may be obtained by coupling means other than transformers, I have shown transformer couplings in the drawing because their use reduces losses and improves the efficiency of the circuit. I have found that the feedback winding can be made with a very small number of turns so that copper losses therein are minimized. Using P-N-P junction transistors rated at 2 watts of dissipation in a circuit arrangement of the type shown in Fig. 4, I have been able to obtain over 100 watts of square-wave power without exceeding the rated dissipation and with an overall power efficiency in excess of 90%.

The term "amplifier," used to define the active elements of the circuits hereinabove described and illustrated, is to be understood as embracing devices providing only dynamic amplification and having a direct-current gain less than unity. A device of this character, which has become known as a double-base diode, is shown in Fig. 6 and has been designated 600. It comprises a body 600′, which may be germanium or silicon, forming a rectifier junction with a metallic layer 600″ to which a first lead 601 is connected, two other leads 602, 603 forming ohmic connections at opposite extremities of the body 600′. The layer 600″ may consist of indium, or an alloy thereof with gallium or aluminum, in the case of germanium and of a lead-gold-arsenic alloy in the case of silicon. As indicated by the reference numerals chosen, connection 601 may be substituted for either of the transistor base connections 401*a*, 401*b* in Fig. 4, connections 602 and 603 at the same time replacing the emitter and collector connections 402*a* or 402*b* and 403*a* or 403*b*, respectively. It will be understood that the device 600 may be used in lieu of not only the main amplifiers 400*a*, 400*b* of Fig. 4 but the ancillary amplifier 410 as well.

The expression "electrically controlled signal-responsive resistance element," used to define the devices 110, 210 etc. of the embodiments herein disclosed, is to be interpreted as limited to devices capable of following at least audio-frequency oscillations and to exclude rheostats, potentiometers and other resistance elements adjustable by mechanical means.

It is to be noted that, to the extent of compatibility, features specifically illustrated in one figure of the drawing may be combined with features found in other embodiments and that, in general, various modifications and adaptations of the arrangements disclosed are possible and will be apparent to persons skilled in the art, all such modifications, adaptations and combinations being therefore intended to be embraced in the scope of invention as defined in the appended claims.

I claim:

1. An oscillation generator comprising amplifier means having an input circuit and an output circuit, feedback means establishing a regenerative path for wave energy from said output circuit to said input circuit, signal-responsive resistance means in said path provided with electric control means, and circuit means for applying a variable electrical quantity to said control means, thereby controlling the amplitude of oscillations produced by said amplifier means, said circuit means including a rectification and integration network degeneratively connected across said output circuit, said network having a time constant substantially greater than the period of said oscillations.

2. An oscillation generator according to claim 1, wherein said signal-responsive resistance means comprises an ancillary amplifier.

3. An oscillation generator according to claim 2, wherein said ancillary amplifier comprises a transistor.

4. An oscillation generator according to claim 1, wherein said feedback means includes a non-linear impedance device in said path in series with said resistance means, said impedance device having a current-versus-voltage characteristic with a substantially vertical portion, further comprising biasing means for adjusting the output of said amplifier means to a value establishing the operating point of said impedance device on said portion.

5. An oscillation generator according to claim 4, wherein said impedance device comprises a solid-state diode.

6. An oscillation generator according to claim 4, wherein said impedance device comprises a glow tube.

7. An oscillation generator according to claim 1, wherein both said amplifier means and said signal-responsive resistance means comprise solid-state transducers.

8. An ocillation generator comprising a pair of push-pull-connected main amplifiers having separate input circuits and a common output circuit, feedback means establishing a regenerative path for wave energy from said output circuit to said input circuits, an ancillary amplifier in said path having a further input circuit, and circuit means for applying a variable electrical quantity to said further input circuit, thereby controlling the amplitude of oscillations produced by said amplifier means.

9. An oscillation generator according to claim 8, wherein said feedback means comprises a coupling transformer.

10. An oscillation generator according to claim 9, wherein said transformer has a secondary winding having its extremities connected to respective terminals of said separate input circuits and having a center tap connected to other terminals of both said separate input circuits by way of said ancillary amplifier.

11. An oscillation generator according to claim 9, wherein said transformer is provided with a saturable core.

12. An oscillation generator according to claim 9, wherein said transformer has a primary winding and tuning condenser means connected across said primary winding.

13. An oscillation generator according to claim 9, wherein said transformer has a secondary winding, said circuit means including a rectification and integration network connected across said secondary winding and a non-linear impedance device forming part of a degenerative connection between said network and said further input circuit.

14. An oscillation generator according to claim 8, wherein said amplifiers comprise solid-state transducers.

15. An oscillation generator according to claim 8, wherein said amplifiers comprise vacuum tubes.

16. An oscillation generator comprising main amplifier means having an input circuit and an output circuit, a feedback connection regeneratively extending from said output circuit to said input circuit in a manner giving rise to high-frequency oscillations in said amplfier means, an ancillary amplifier having its forward path serially included in said feedback connection, said ancillary amplifier being provided with a pair of control terminals, and a low-frequency signal source connected across said control terminals for varying the amplitude of said high-frequency oscillations.

17. An oscillation generator according to claim 16, wherein said signal source comprises rectifier means in said output circuit, an impedance connected in said output circuit in series with said rectifier means, and circuit means connecting at least a part of said impedance between said control terminals.

18. An oscillation generator according to claim 16, further comprising biasing means normally maintaining said ancillary amplifier in a condition of minimum conductivity, rectifier means connected across said signal source for producing a variable biasing voltage dependent upon average signal strength, and circuit means connecting said rectifier means across said control terminals in a sense tending to increase the conductivity of said ancillary amplifier means in the presence of signals, thereby causing said main amplifier means to produce oscillations of an amplitude varying in response to said signals about a mean value dependent upon said average signal strength.

19. An oscillation generator according to claim 16, wherein said ancillary amplifier comprises a double-base diode.

20. An oscillation generator according to claim 16, wherein said ancillary amplifier comprises a magneto-resistive element.

21. An oscillation generator comprising main amplifier means having an input electrode and an output electrode, a direct-current feedback connection regeneratively extending from said output electrode to said input electrode in a manner giving rise to high-frequency oscillations in said amplifier means, an ancillary amplifier having its forward path serially included in said feedback connection, said ancillary amplifier being provided with a pair of control terminals, and a low-frequency signal source connected across said control terminals for varying the amplitude of said high-frequency oscillations.

References Cited in the file of this patent

UNITED STATES PATENTS

| | | |
|---|---|---|
| 1,463,796 | Carson | Aug. 7, 1923 |
| 2,231,558 | Bollman | Feb. 11, 1941 |
| 2,391,085 | Crandell | Dec. 18, 1945 |
| 2,417,805 | Barnard | Mar. 25, 1947 |
| 2,424,905 | Scheldorf | July 29, 1947 |
| 2,442,138 | Mann et al. | May 25, 1948 |
| 2,456,802 | Walsh | Dec. 21, 1948 |
| 2,581,273 | Miller | Jan. 1, 1952 |
| 2,661,425 | Mittelmann | Dec. 1, 1953 |
| 2,700,130 | Geyger | Jan. 18, 1955 |
| 2,748,274 | Pearlman | May 29, 1956 |
| 2,784,367 | Van der Polder | Mar. 5, 1957 |
| 2,793,292 | Wolff | May 21, 1957 |